US006432373B1

(12) United States Patent
Tanazawa et al.

(10) Patent No.: US 6,432,373 B1
(45) Date of Patent: Aug. 13, 2002

(54) METHOD FOR REMOVING NITROGEN OXIDES FROM EXHAUST GAS

(75) Inventors: Satoshi Tanazawa, Saitama; Ken-ichiro Kobayashi, Tokyo; Hiroaki Hayashi, Osaka; Motonobu Kobayashi, Hyogo, all of (JP)

(73) Assignees: Tokyo Gas Co., Ltd., Tokyo; Nippon Shobukai Co., Ltd., Osaka, both of (JP)

( * ) Notice: Subject to any disclaimer, the term of this patent is extended or adjusted under 35 U.S.C. 154(b) by 0 days.

(21) Appl. No.: 08/429,767

(22) Filed: Apr. 27, 1995

Related U.S. Application Data

(63) Continuation of application No. 08/035,759, filed on Mar. 24, 1993, now abandoned.

(30) Foreign Application Priority Data

Mar. 27, 1992 (JP) .......... 4-071677
Mar. 27, 1992 (JP) .......... 4-071678
Mar. 27, 1992 (JP) .......... 4-071679

(51) Int. Cl.[7] .......... B01J 8/00; C01B 21/20
(52) U.S. Cl. .......... 423/235; 423/239.1
(58) Field of Search .......... 423/239.1, 235; 134/22.1; 431/6

(56) References Cited

U.S. PATENT DOCUMENTS

| | | | | |
|---|---|---|---|---|
| 3,523,683 A | * | 8/1970 | Baird et al. | 266/30 |
| 4,842,834 A | * | 6/1989 | Burton | 423/239.1 |

FOREIGN PATENT DOCUMENTS

| | | | |
|---|---|---|---|
| DE | 1607964 | * | 8/1970 |
| DE | A-0337073 | | 10/1989 |
| DE | A-0364694 | | 4/1990 |
| EP | A-0443207 | | 8/1991 |
| FR | A-2143620 | | 2/1973 |
| JP | A-0303560 | | 1/1989 |
| JP | 2265619 | * | 10/1990 |
| WO | A-8907982 | | 9/1989 |

OTHER PUBLICATIONS

Translated Abstract of '964 reference. Aug. 1970.*
Translated abstract of '619 reference. Oct. 1990.*
Japan Patent Abstract for Japanese Patent Publication No. 2–194817. (1990).
Database WPIL Section Ch, Week 9049, Derwent Pu. Ltd., London, GB; AN 90–364439 & JP–A–2 261 519 (Babcock–Hitachi KK) Oct. 24, 1990 (Abstract).
Database WPIL Section Ch, Week 9049, Derwent Publication Ltd., London, GB; AN 90–366367 & JP–A–2 265 619 (Nippon Kokan KK) Oct. 30, 1990 (Abstract).

* cited by examiner

*Primary Examiner*—Steven P. Griffin
*Assistant Examiner*—Christina Ildebrando
(74) *Attorney, Agent, or Firm*—Armstrong, Westerman & Hattori, LLP

(57) ABSTRACT

In an apparatus for selectively reduction-removing nitrogen oxides in exhaust gas in presence of catalyst by spraying aqueous solid reducing agent solution into exhaust gas flowing through a duct to mix the reducing agent into exhaust gas, the present invention prevents nozzle-clogging caused by the reducing agent or its reaction product, permits stable and continuous spraying and uniform mixing of the reducing agent solution into exhaust gas, and thus removes nitrogen oxides at a high efficiency. The nozzle is cooled by supplying at least one of water and gas before supplying the solution into the nozzle. Upon discontinuing supply of the solution to the nozzle, at least one of water and gas is supplied to remove the solution remaining in the nozzle. The solution stored at high concentration is sprayed after diluting it with water in the course of transfer for spraying. A line for supplying water for diluting is added to the line for supplying the solution. On the side peripheral surface of the duct, a nozzle having double-tube structure comprising an inner and an outer tube in which the inner tube tip projects by 1 to 5 mm from the outer tube tip is installed, the solution is supplied into the nozzle inner tube and spray gas is supplied between the inner and outer tubes to spray the solution to exhaust gas.

20 Claims, 15 Drawing Sheets

METHOD FOR REMOVING NITROGEN OXIDES FROM EXHAUST GAS

This application is a continuation of application Ser. No. 08/035,759 filed Mar. 24, 1993, now abandoned.

BACKGROUND OF THE INVENTION

The present invention relates to a method and an apparatus for removing nitrogen oxides (NOx) in exhaust gas by using a solid reducing agent, bringing nitrogen oxides into contact with a catalyst, and reducing the nitrogen oxides at a high efficiency.

Concerning a method for removing nitrogen oxides from exhaust gas discharged from a gas turbine, a gas engine, a diesel engine, a heating furnace, various boilers and the like, the selective catalytic reduction method using ammonia as a reducing agent has conventionally been applied in the de-NOx process of various stationary NOx generation sources because of the possibility to selectively remove nitrogen oxides at a high efficiency without being affected by the oxygen concentration in the exhaust gas. Ammonia is supplied in the form of liquid ammonia or aqueous ammonia.

Cogeneration systems using gas turbines, gas engines and diesel engines as driving sources have recently been rapidly increasing in number in coastal and city areas in view of global environmental protection and economical considerations, and along with this, installation of a de-NOx process in buildings and residential areas is required. In this case, the use of liquid ammonia and aqueous ammonia as a reducing agent is restricted under the regulations such as the Poisonous and Deleterious Substances Control Law, the High-Pressure Gas Control Law and the Fire Prevention Law (all of which are Japanese laws), and in addition, a special care must be taken for handling, transportation and storage thereof to prevent leakage of odors.

To solve the above problems, it is necessary to use an easy-to-handle and highly stable reducing agent in place of ammonia. Japanese Official Patent Provisional Publication No. 2-194817 discloses a method of removing NOx using a solid reducing agent such as urea, melamine, and cyanuric acid in the solid or liquid state as the easy-to-handle and highly stable reducing agent.

The aqueous solution of the solid reducing agent permits easy handling such as transportation and storage, but since the weight of water becomes an excessive load, the solid reducing agent is often handled in the form of an aqueous solution having a high concentration near the saturated concentration which gives favorable cost merits.

The aqueous solution of solid reducing agent is sprayed from a nozzle provided in the duct into exhaust gas flowing through the duct and is mixed with the exhaust gas.

SUMMARY OF THE INVENTION

When beginning to supply the aqueous solution of the solid reducing agent to the nozzle, the portions near the nozzle have already a high temperature (about 500° C., for example, in the case of exhaust gas from a gas turbine) and, if the aqueous solution of the solid reducing agent is supplied there, water immediately evaporates. If water evaporates, the solid reducing agent is very easily crystallized or polymerized. In a case of the high-concentration aqueous solution of solid reducing agent, it is supplied to the nozzle at a lower flow rate compared with a solution having a low concentration, and therefore, water tends to be easily consumed by evaporation. Consequently, the nozzle is clogged off and this makes it impossible to supply the aqueous solution of solid reducing agent and hence causes discontinuance of the functions of the de-NOx facilities.

When supply of the aqueous solution of solid reducing agent to the nozzle is discontinued in order to terminate de-NOx treatment, the nozzle is heated by the residual heat of the duct, thus causing evaporation of water from the aqueous solution remaining near the nozzle. As a result, the nozzle or the line for supplying the solution is clogged off, making it impossible to supply the aqueous solution of reducing agent when starting the next run of de-NOx treatment.

The present invention was developed in view of the problems as described above, and has therefore the first object to provide a method and an apparatus for removing nitrogen oxides, which prevent the nozzle interior and tip portions from being clogged off by the solid reducing agent or reaction products thereof and maintain stable and continuous spraying of the aqueous solution of solid reducing agent into exhaust gas.

In a case of the high-concentration aqueous solution of solid reducing agent, a low flow rate of the aqueous solution of solid reducing agent makes it impossible to obtain a sufficient spraying performance of the nozzle and prevents uniform dispersion of the solid reducing agent in the exhaust gas duct. Consequently, the reduction reaction on the $N_x$ removing catalysts does not sufficiently occur, resulting in increase of the unreacted ammonia amount, and thus exhaust gas is discharged together with ammonia.

Thus, the present invention has the second object to provide a method and an apparatus for removing nitrogen oxides contained in exhaust gas at a high efficiency and decreasing the amount of unreacted ammonia by uniformly mixing said solution into exhaust gas even in a case of using the high-concentration aqueous solution of solid reducing agent.

Figure 14:
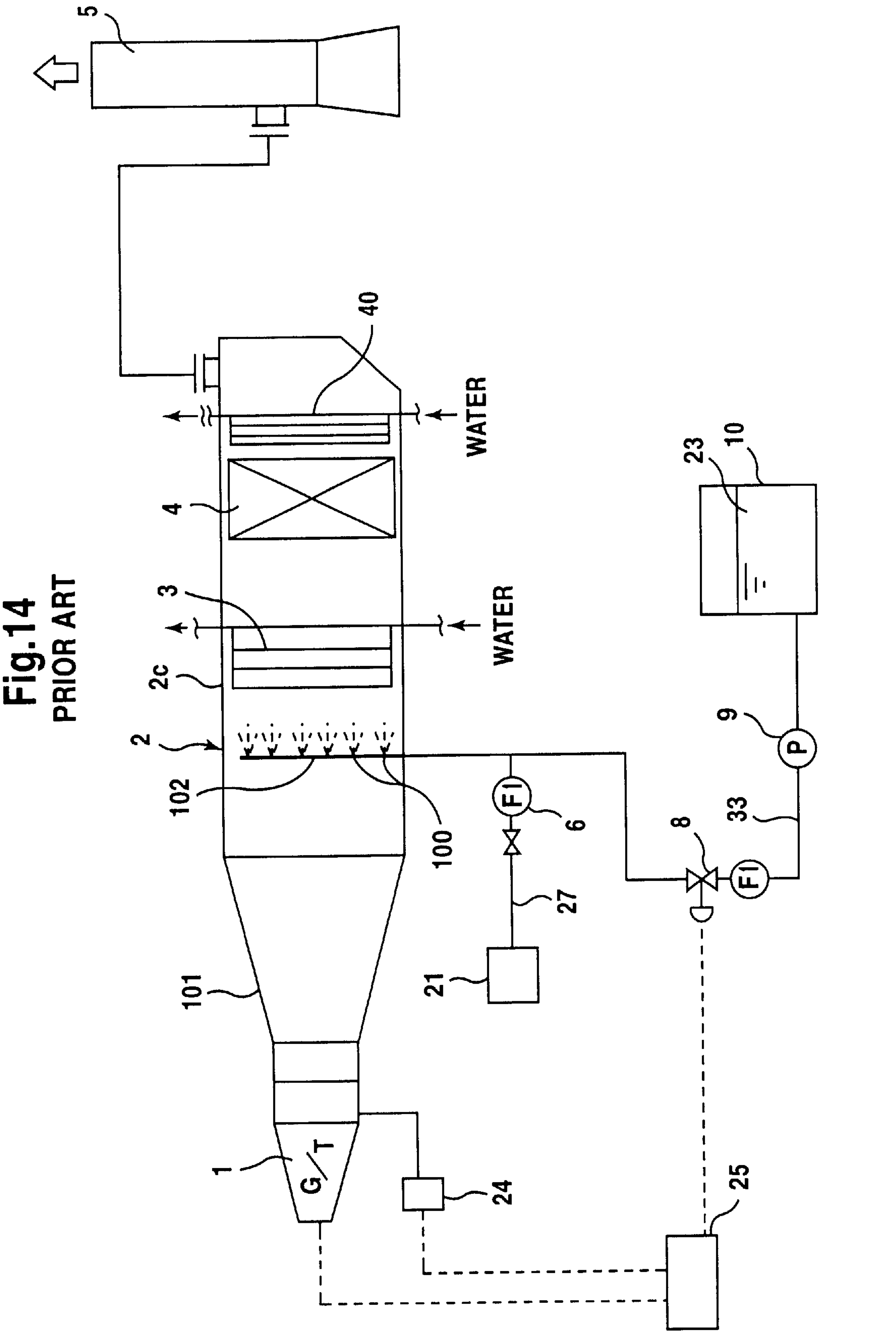
FIG. 14 is a schematic longitudinal sectional view illustrating an embodiment of the conventional apparatus for removing nitrogen oxides.
Figure 15:
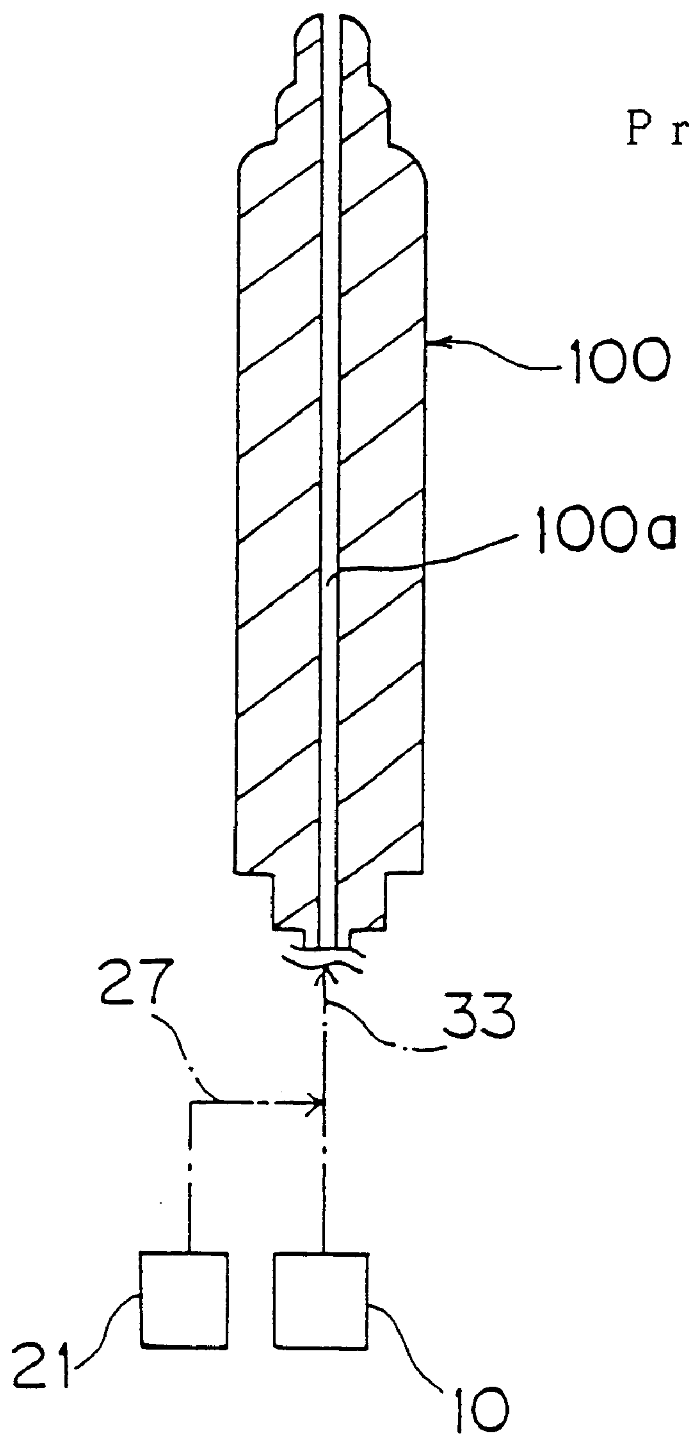
FIG. 15 is a schematic sectional view illustrating a nozzle used hitherto.

In the conventional apparatus for removing nitrogen oxides, as shown in FIG. 14, a nozzle 100 for spraying an aqueous solution of solid reducing agent is attached to the central portion of a piping 102 extending from the side peripheral surface of a duct 101 across the duct 101. This is to ensure uniform mixing of the sprayed aqueous solution of solid reducing agent into exhaust gas. As shown in FIG. 15, the conventional nozzle 100 has a single-tube structure, which is designed so as to spray the aqueous solution 23 of solid reducing agent by supplying both the aqueous solution 23 of solid reducing agent and the spray gas 21 into the tube 100*a*.

When spraying the aqueous solution of solid reducing agent into exhaust gas with the use of a conventional nozzle 100 as shown in FIG. 15, heat conduction from high-temperature exhaust gas to the nozzle easily causes precipitation and solidification of the solid reducing agent and reaction products thereof in the nozzle, which clog off the interior and the tip portion of the nozzle. In addition, because a piping 102 installed between the side peripheral surface of a duct 101 and the center portion thereof is constantly exposed to high-temperature exhaust gas flow, similar phenomena easily occur also in the piping 102.

The aqueous solution of solid reducing agent sprayed from the nozzle into exhaust gas is still in the liquid particle state. Spraying the aqueous solution of solid reducing agent through a conventional nozzle having the single-tube structure leads to insufficient uniform mixing with exhaust gas, and this results in a low de-NOx efficiency, leaving a large amount of unreacted ammonia.

The present invention was developed in view of the problems as described above and has the third object to provide a method and apparatus which permit prevention of clogging of the nozzle interior and the tip portion thereof caused by the solid reducing agent or reaction products thereof, insures stable and continuous spraying of the aqueous solution of solid reducing agent into exhaust gas as well as uniform mixing of the aqueous solution of solid reducing agent into exhaust gas, and thereby remove nitrogen oxides contained in exhaust gas at a high efficiency.

To solve the above-mentioned first object, the present invention is, in a method for removing nitrogen oxides in which selectively reduction-removing of nitrogen oxides contained in exhaust gas is carried out in the presence of a catalyst by spraying an aqueous solution of a solid reducing agent from a nozzle to the exhaust gas flowing through a duct to mix the solid reducing agent into the exhaust gas; characterized in comprising previously causing at least one of water and gas to flow prior to beginning supplying the aqueous solution of the solid reducing agent to the nozzle, and thereby cooling the nozzle.

To solve the above-mentioned first object, the present invention is, in a method for removing nitrogen oxides in which selectively reduction-removing of nitrogen oxides contained in exhaust gas is carried out in the presence of a catalyst by spraying an aqueous solution of a solid reducing agent from a nozzle to the exhaust gas flowing through a duct to mix the solid reducing agent into the exhaust gas; also characterized in comprising causing at least one of water and gas to flow after discontinuance of supply of the aqueous solution of the solid reducing agent to the nozzle, and thereby removing said aqueous solution remaining in the nozzle.

To solve the above-mentioned second object, the present invention is, in a method for removing nitrogen oxides in which selectively reduction-removing of nitrogen oxides contained in exhaust gas is carried out in the presence of a catalyst by spraying an aqueous solution of a solid reducing agent to the exhaust gas flowing through a duct to mix the solid reducing agent into the exhaust gas; characterized in comprising spraying the aqueous solution of solid reducing agent after said solution stored at a high concentration is diluted with water in the course of transfer for spraying.

To solve the above-mentioned third object, the present invention is, in a method for removing nitrogen oxides in which selectively reduction-removing of nitrogen oxides contained in exhaust gas is carried out in the presence of a catalyst by spraying an aqueous solution of a solid reducing agent to the exhaust gas flowing through a duct to mix the solid reducing agent into the exhaust gas; characterized in comprising previously installing on the side peripheral surface of the duct a nozzle having double-tube structure comprising an inner tube and an outer tube in which the inner tube tip end projects by 1 to 5 mm from the outer tube tip end, supplying the aqueous solution of solid reducing agent into the inner tube of said nozzle as well as supplying a spray gas into the space between said inner and outer tubes, and thereby spraying the aqueous solution of solid reducing agent to the exhaust gas.

To solve the forementioned first object, an apparatus for removing nitrogen oxides relating to the present invention is, in an apparatus for removing nitrogen oxides being equipped with a duct which is used for causing exhaust gas to flow through the duct, with a nozzle which is installed in the duct in order to spray an aqueous solution of a solid reducing agent to the exhaust gas flowing through the duct, with a catalyst layer which is arranged in the duct in order to promote a reduction reaction of nitrogen oxides contained in the exhaust gas, and with a storage tank and a pipe line both of which are used for supplying said aqueous solution to the nozzle; characterized in being further equipped with a pipe line which is used for causing at least one of water and gas to flow through the nozzle and in being arranged so as to cool the nozzle by causing at least one of water and gas to flow through the nozzle prior to beginning supplying the aqueous solution of the solid reducing agent to the nozzle and/or so as to remove said aqueous solution remaining in the nozzle by causing at least one of water and gas to flow through the nozzle after discontinuance of supply of the aqueous solution to the nozzle. To solve the forementioned second object, an apparatus for removing nitrogen oxides relating to the present invention is characterized in that, to said line used for supplying the aqueous solution, a pipe line for supplying water for diluting the aqueous solution is connected. Here, a pipe line for supplying water for cooling the nozzle, a pipe line for supplying water for removing the aqueous solution remaining in the nozzle, and a pipe line for supplying water for diluting the aqueous solution may be installed separately from each other or may simultaneously have the functions of each other. Also, to solve the forementioned third object, an apparatus for removing nitrogen oxides relating to the present invention is characterized in that the nozzle has double-tube structure comprising an inner tube and an outer tube in which the inner tube tip end projects by 1 to 5 mm from the outer tube tip end, and that the nozzle is installed on the side peripheral surface of the duct and arranged so as to spray said aqueous solution of the solid reducing agent into the exhaust gas by supplying the aqueous solution into the inner tube of said nozzle as well as by supplying a spray gas into the space between said inner and outer tubes.

In the present invention, exhaust gas discharged from a gas turbine, a gas engine, a diesel engine, a heating furnace, various boilers and the like is caused to flow through a duct as usual. An aqueous solution of a solid reducing agent is sprayed to exhaust gas flowing through the duct, and after carrying out reduction reaction of nitrogen oxides contained in exhaust gas and removing them, exhaust gas is discharged outside the system.

The solid reducing agent is a reducing agent which is solid at ordinary temperature, including urea, melamine, ammonium carbonate, ammonium bicarbonate, cyanuric acid and the like. Particularly, when urea is used as the reducing agent in the form of an aqueous solution, handling such as transportation, storage and the like is easy, and at the same time, very favorable merits are available in practice because of the lower cost as compared with melamine, ammonium carbonate, ammonium bicarbonate, cyanuric acid and the like.

In the present invention, at least one of a pipe line for supplying water (a water supply line) and a pipe line for supplying gas (a gas supply line) is connected to a pipe line for supplying the aqueous solution of solid reducing agent provided between the nozzle and a storing means which is used for storing the aqueous solution of solid reducing agent.

At start-up, water is supplied from the water supply line and/or gas is supplied from the gas supply line to decrease the temperature near the nozzle to a constant level. Supply of water from the water supply line to the nozzle is usually conducted, depending upon the volume in the piping, at a flow rate of 0.2 l/minute for at least three minutes, and the supply of gas from the gas supply line to the nozzle is usually carried out at a flow rate of 10 l/minute for at least three minutes.

In this state, the aqueous solution of solid reducing agent is then supplied from the supply line of aqueous reducing agent solution to spray it from the nozzle for de-NOx treatment.

Upon stoppage of the de-NOx treatment, the supply of the aqueous solution of solid reducing agent is discontinued, and water is supplied from the water supply line and/or gas is supplied from the gas supply line until the aqueous solution remaining in the nozzle and in the supply line near the nozzle is replaced by water and/or gas. Supply of water from the water supply line to the nozzle is usually conducted, depending upon the volume in the piping, at a flow rate of 0.2 l/minute for at least three minutes, and supply of gas from the gas line to the nozzle is usually carried out at a flow rate of 10 l/minute for at least three minutes.

Concerning the water supplied from the water supply line, any of industrial water, boiler water, pure water and service water may be employed and, concerning the gas supplied from the gas line, there is no particular restriction so far as it is a gas inert to the solid reducing agent, such as air, steam and nitrogen.

The concentration of the aqueous solution of solid reducing agent in storage is dependent upon the kind of the solid reducing agent used, but the concentration is substantially in a range not exceeding the saturated concentration at 0° C. (for example, 40 wt. % or less for an aqueous urea solution) and is preferably as high as possible. This aqueous solution having a high concentration may be sprayed in the condition as it is, but the solution is preferably diluted with water to be at least twice as large in volume when sprayed from the nozzle. Water for this dilution can be supplied from the above-mentioned pipe line. A degree of dilution lower than the above-mentioned range leads to a high concentration of the solid reducing agent, which would then be supplied at a low flow rate to the nozzle. Consequently, the spray performance of the nozzle is deteriorated and the solid reducing agent becomes difficult to be dispersed in exhaust gas, thus resulting in a decreased de-NOx efficiency, or heat conduction from the high-temperature exhaust gas causes crystallization of the solid reducing agent in the inner tube of the nozzle and may clog off the nozzle.

A supplying amount of the high-concentration aqueous solution of solid reducing agent and a supplying amount of the diluting water are appropriately set taking account of the prevention of precipitation of solid reducing agent in the inner tube of the nozzle, resulting from heat conduction from exhaust gas, and taking account of uniform mixing of the solid reducing agent into exhaust gas. In the present invention, in a case where the aqueous solution of reducing agent which contains water in the amount larger than that in the conventional practice, i.e., the aqueous solution which is prepared by diluting it as described above is supplied to the nozzle, a thermal capacity and a flow rate become high.

In the present invention, the nozzle (for injecting the aqueous solution of solid reducing agent) may be installed near the duct center. It is, however, preferable to install the nozzle on the side peripheral surface of the duct in order to spray the aqueous solution of solid reducing agent. This permits prevention of clogging of the piping leading to the nozzle.

Installation of the nozzle on the side peripheral surface of the duct may impair uniform mixing of the sprayed aqueous solution of solid reducing agent into the exhaust gas, but uniform mixing of the solution can be accomplished by using an appropriate design of the nozzle. More specifically, the nozzle preferably has a double-tube structure comprising an inner tube and an outer tube so as to permit supply of the aqueous solution of solid reducing agent into the inner tube, and at the same time, supply of spray gas for cooling into the space between the inner and outer tubes. This inhibits heat conduction from outside the nozzle to the nozzle inner tube, thus enabling to avoid undesirable phenomena such as crystallization of the solid reducing agent at the nozzle tip and nozzle clogging caused by reaction products.

By adopting, furthermore, a design in which the tip end of the nozzle inner tube projects by 1 to 5 mm from the tip end of the outer tube, it becomes possible to fine and atomize the aqueous solution. This is preferable in that uniform mixing of the solution into exhaust gas is further promoted. If the projection length of the nozzle inner tube tip end is less than 1 mm, liquid drops of the aqueous solution fall down along the outer wall of the inner tube. As a result, solidified solid reducing agent accumulates in the space between the outer and inner tubes, and this may cause clogging of the nozzle. On the other hand, if the projection length of the inner tube tip end is more than 5 mm, dispersion of the solution into exhaust gas may become poorer.

The nozzle is preferably arranged so that the tip of the outer tube does not project from the duct inner peripheral surface to the duct interior, i.e., so that it is located at a position flush with the duct inner peripheral surface or lower than the surface toward outside. If the outer tube tip projects from the duct inner peripheral surface, the cooling effect of spray gas flowing through the space between the nozzle outer and inner tubes is reduced, causing the solid reducing agent to precipitate and solidify in the inner tube at the tip portion of the nozzle, and this may cause clogging of the nozzle.

The spray gas supplied to the space between the nozzle inner and outer tubes is not subject to any particular restriction so far as it is a gas inert to the solid reducing agent such as air, steam and nitrogen.

The number of installed nozzles may be one or more, but plural nozzles are preferable. Installation of plural nozzles permits uniform dispersion of the sprayed aqueous solution of solid reducing agent into the exhaust gas.

When installing a plurality of nozzles on the side peripheral surface of the duct, it is preferable to arrange the plurality of nozzles at substantially equal intervals on the side peripheral surface along the periphery. The nozzles are installed every angle obtained by dividing the circumference of 360° by the number of nozzles; four nozzles, for example, would be arranged every 90°.

The direction of a nozzle may be any of that toward upstream of the exhaust gas flow, toward downstream thereof and right angles to the exhaust gas flow. With a view to achieving uniform mixing of the aqueous solution of solid reducing agent sprayed from the nozzle into exhaust gas, the nozzle is preferably set at an angle within a range of from 45 to 135° relative to the exhaust gas flow.

By simultaneously supplying the aqueous solution of solid reducing agent and spray gas into the nozzle inner tube in order to increase the passing velocity of the solution through the nozzle inner tube under the effect of the spray gas, heat conduction to the solution is effectively prevented. This not only permits prevention of clogging of the nozzle tip portion, but also allows improvement of dispersion thereof into exhaust gas.

When the injection nozzle of the aqueous solution of solid reducing agent is installed in a zone where the flow velocity of exhaust gas within the exhaust duct is at least 15 m/second, the solution is more uniformly dispersed in exhaust gas, leading to more favorable results with a higher de-NOx efficiency. Because the flow velocity of exhaust gas usually depends upon the duct cross-sectional area, it is desirable to install the nozzle on the side peripheral surface of the duct having a cross-sectional area suitable for such a flow velocity.

The velocity of the aqueous solution of solid reducing agent passing through the nozzle inner tube is preferably at least 0.1 m/second. If the velocity is under this range, the nozzle may be clogged off because of crystallization or polymerization of the solid reducing agent in the nozzle inner tube under the effect of heat conduction from high-temperature exhaust gas. The velocity of spray gas passing through the space between the nozzle inner and outer tubes is preferably set at a value equal to or more than ten times as high as the velocity of the aqueous solution passing through the nozzle inner tube. A velocity of under this range leads to a poorer dispersion of the aqueous solution of solid reducing agent sprayed from the nozzle into exhaust gas and reduces the cooling effect by the spray gas flowing through the space between the nozzle inner and outer tubes, thus causing precipitation and solidification of the solid reducing agent in the nozzle inner tube, and hence clogging of the nozzle.

When both the aqueous solution of solid reducing agent and the spray gas are supplied into the nozzle inner tube, the ratio of the solution to the spray gas is preferably up to 20 volume parts of spray gas based on 1 volume part of the aqueous solution. Even when the amount of spray gas is increased to over this range, improvement of NOx removing performance based on improved dispersion of the aqueous solution of solid reducing agent into exhaust gas cannot be expected.

The method of the present invention is applicable before or after desulfurization, and in a case where boiler exhaust gas is treated, the method is usually applied before desulfurization.

Upon start-up, the nozzle is exposed to high temperatures under the effect of heat conduction from the high-temperature exhaust gas to the nozzle interior. However, by supplying water or gas before supplying the aqueous solution of solid reducing agent, and thus by cooling the nozzle, evaporation of water from the aqueous solution of solid reducing agent, if any, never causes crystallization or denaturation of the solid reducing agent.

Occurrence of crystallization or denaturation of the solid reducing agent may be minimized by removing or replacing the aqueous solution of solid reducing agent remaining in the nozzle and lines with water or gas at stoppage.

As a result, it is possible continuously to spray the aqueous solution of reducing agent without occurrence of clogging of the nozzle even if start-up and discontinuance are repeated, thus permitting continuous operation of the de-NOx facilities for a long period of time.

By spraying the stored aqueous solution of solid reducing agent after diluting the solution with water in the course of transfer for spraying, it is possible to store the solid reducing agent in the form of a high-concentration solution which gives advantages in cost, and crystallization and denaturation of the solid reducing agent are hard to occur even if water is evaporated under the effect of heat conduction from the high-temperature exhaust gas to the nozzle interior. As a result, the reducing agent solution can be continuously sprayed without nozzle clogging, and the de-NOx facilities can be continuously operated for a longer period of time. In addition, since the flow rate of the aqueous solution of solid reducing agent increases, a sufficient spraying performance of the nozzle is obtained, and it is easy uniformly to disperse the solid reducing agent into the exhaust gas duct. Consequently, the amount of unreacted ammonia at the $NO_x$ -removing catalyst decreases.

By using a nozzle having double-tube structure comprising an inner tube and an outer tube in which the inner tube tip projects by 1 to 5 mm from the outer tube tip, by installing the nozzle on the side peripheral surface of the duct, by supplying the aqueous solution of solid reducing agent into the nozzle inner tube as well as supplying spray gas into the space between the inner and outer tubes, and thus by spraying the aqueous solution of solid reducing agent to exhaust gas, it is possible continuously to conduct spraying for a long period of time without the nozzle being clogged off because of precipitation of the solid reducing agent or because of reaction products, and the solid reducing agent is uniformly mixed into exhaust gas.

Installation of the nozzle in the central portion of the duct, where the nozzle would be exposed to high-temperature exhaust gas flow, causes clogging of the nozzle by the precipitation of the solid reducing agent or reaction products thereof in the nozzle and the piping. However, installation of the nozzle on the side peripheral surface of the duct permits in contrast easy maintenance of the nozzle by preventing occurrence of precipitation of the solid reducing agent or reaction products thereof.

According to the present invention, it becomes possible continuously to spray the aqueous solution of solid reducing agent into exhaust gas for a long period of time without clogging of the nozzle for injecting the aqueous solution. Furthermore, because the aqueous solution is uniformly mixed into exhaust gas, an excellent de-NOx performance can be stably obtained. Also, according to the present invention, the amount of unreacted ammonia contained in exhaust gas (the amount of slipped ammonia) is decreased, cost saving can be achieved owing to decrease of the using amount of a solid reducing agent such as urea and the like, and thus the de-NOx performance is improved.

DESCRIPTION OF THE PREFERRED EMBODIMENTS

The present invention is now described with reference to the drawings illustration embodiments. The present invention is not however limited to those shown in the drawings.

Figure 1:
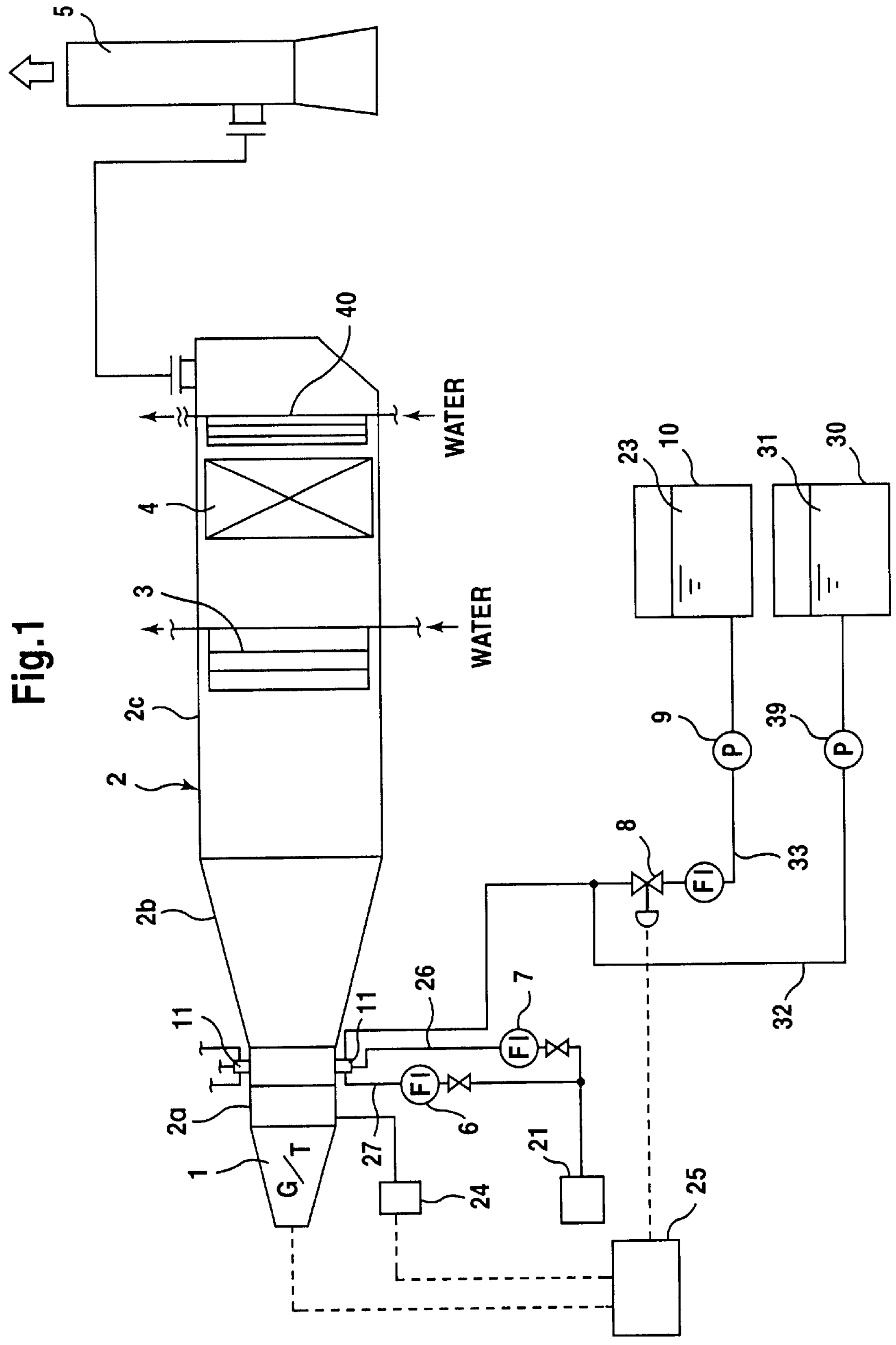
FIG. 1 is a schematic longitudinal sectional view illustrating an apparatus used in an embodiment of the method of the present invention for removing nitrogen oxides.

FIG. 1 shows an embodiment of the de-NOx apparatus of the present invention, and is a schematic view illustrating the case where a nozzle for injecting the aqueous solution of solid reducing agent into a region in which exhaust gas flows at a flow velocity of at least 15 m/second. In the de-NOx apparatus shown in FIG. 1, exhaust gas from a gas turbine 1 which is an exhaust gas generation source flows through a duct 2. The duct 2 is a circular-section duct in this embodiment shown, and has a high flow velocity region 2*a* having the same diameter as that of the gas turbine 1, an expanding region 2*b* with a divergent diameter, and a low flow velocity region 2*c* having a large diameter, from upstream to downstream of the exhaust gas flow. Exhaust gas flows usually at a flow velocity of at least 15 m/second in the high flow velocity region 2*a,* and at a flow velocity within a range of from 5 to 10 m/second in the low flow velocity region 2*c.* A nozzle 11 is provided in the high flow velocity region 2*a,* and a waste heat recovery boiler (waste heat boiler) 3, a de-NOx catalyst layer 4 and an economizer 40 are sequentially provided in the low flow velocity region 2*c.*

Figure 3:
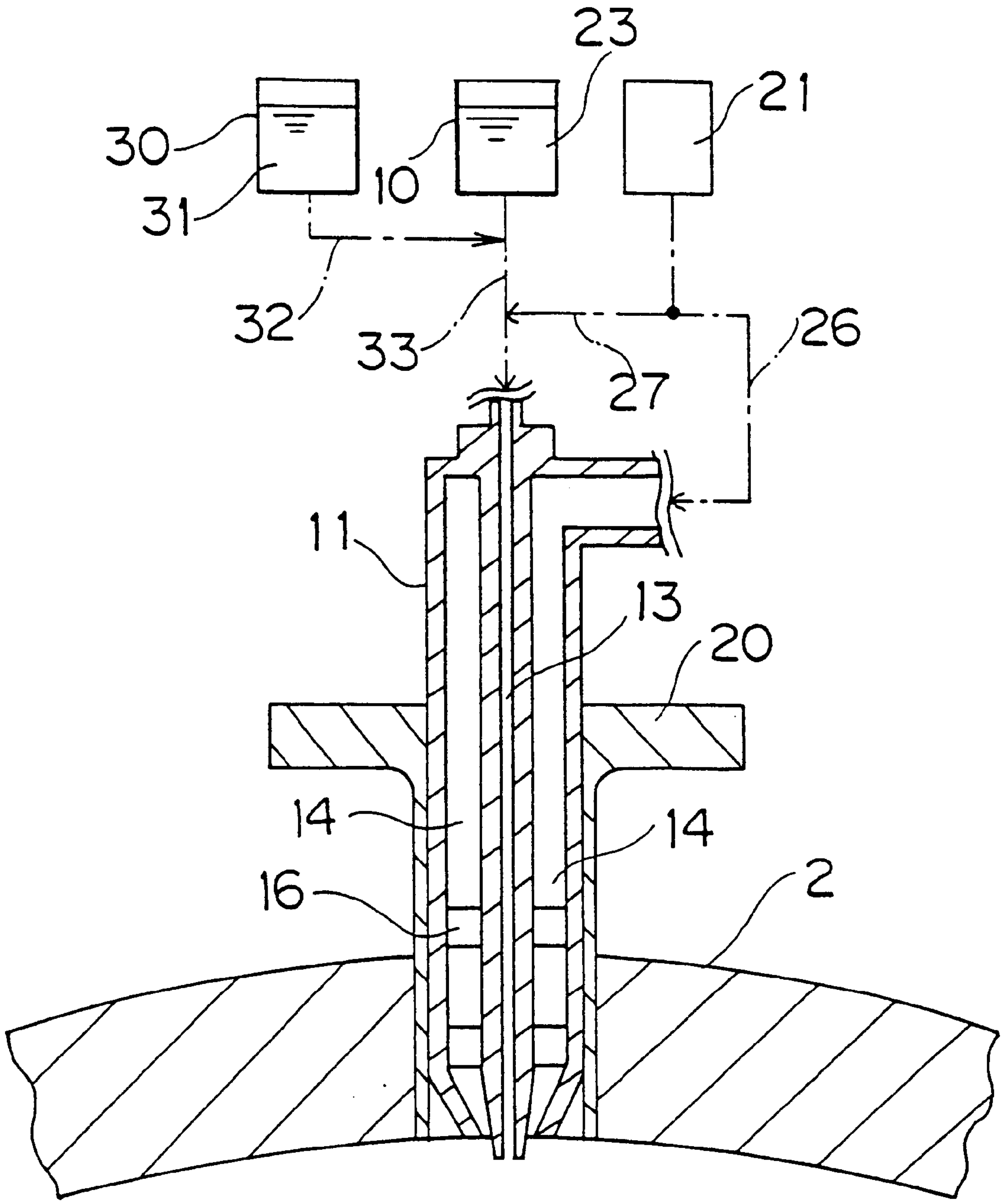
FIG. 3 is a descriptive view illustrating the attachment of the nozzle in the apparatus shown in FIG. 1.

As shown in FIG. 3, a pipe line 33 for supplying the aqueous solution of solid reducing agent is provided between the nozzle 11 and a storage tank 10 which is designed to store high-concentration aqueous solution 23 of the solid reducing agent. A water supply line 32 designed to supply water 31 to the line 33 is connected to the reducing agent solution supply line 33. Before and/or after supply of high-concentration aqueous solution 23 by a pump 9 from the storage tank 10 through the line 33 for supplying the reducing agent solution, water 31 is supplied by another pump 39 from a water storage tank 30 through the water supply line 32 to the nozzle 11. Thereafter, the aqueous reducing agent solution is supplied from the line 33 and sprayed from the nozzle 11 into the duct 2. The high-concentration solution 23 supplied through the line 33 may, as required, join water 31 supplied by the pump 39 from the water storage tank 30 through the water supply line 32 in the middle of the way, be diluted, and then be sprayed from the nozzle 11 into the duct 2.

As shown in FIG. 1, the joining point of the water supply line 32 with the reducing agent solution supply line 33 is arranged in the downstream of a flow control valve 8. The reason for this is that the control of flow rate of the solution of solid reducing agent is easier in the state of thicker solution before dilution, that the dilution in the upstream of the flow control valve 8 requires concentration management after dilution, and therefore that installation of the joining point of the water supply line 32 in the downstream of the flow control valve 8 would require a lower equipment cost.

Exhaust gas flowing from the gas turbine 1 is mixed with the solid reducing agent precipitating from the aqueous solution of solid reducing agent sprayed from the nozzle 11. The aqueous solution of solid reducing agent sprayed to exhaust gas is thermally decomposed to produce ammonia. In this state, nitrogen oxides are selectively reduced and removed during passage through the waste heat boiler 3 and the de-NOx catalyst layer 4, and the exhaust gas is led through the economizer 40 toward a chimney 5 and discharged outside. The waste heat boiler 3 and the economizer 40 are provided, if necessary.

The de-NOx catalyst layer 4 is loaded with a catalyst for accelerating reduction reaction of nitrogen oxides, such as: a honeycomb catalyst comprising $TiO_2$ as a carrier, $V_2O_5$ and $WO_3$ as active components; and other catalysts.

Figure 2:
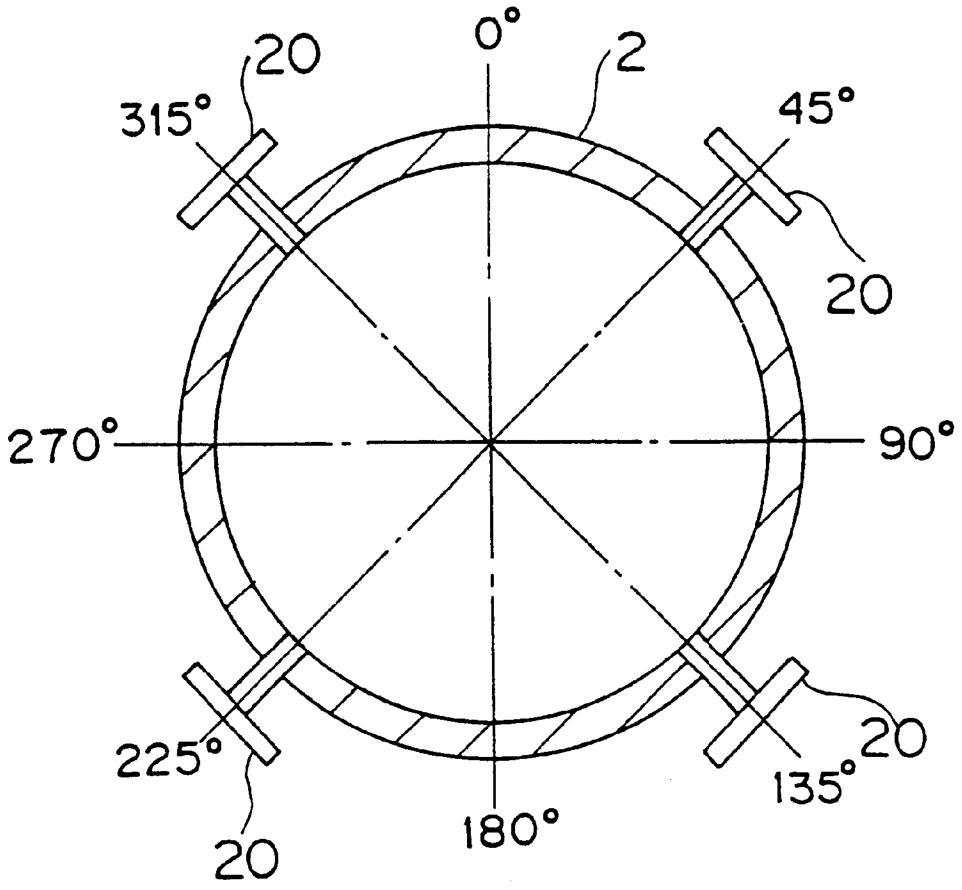
FIG. 2 is a descriptive view illustrating the layout of the nozzle in the apparatus shown in FIG. 1.

The nozzles 11 are, as shown in FIG. 2, mounted on nozzle mounts 20 provided at substantially equal intervals along the circumference of the side peripheral surface of the duct 2. In other words, four nozzles 11 are provided at every 90°. The nozzle 11 is, as shown in FIG. 3, mounted on the nozzle mount 20 fitted to the duct 2. The nozzle 11 is fitted to the flange of the mount 20, for example, so that the outer tube tip thereof does not project from the inner peripheral surface of the duct 2 into the duct interior.

Figure 4:
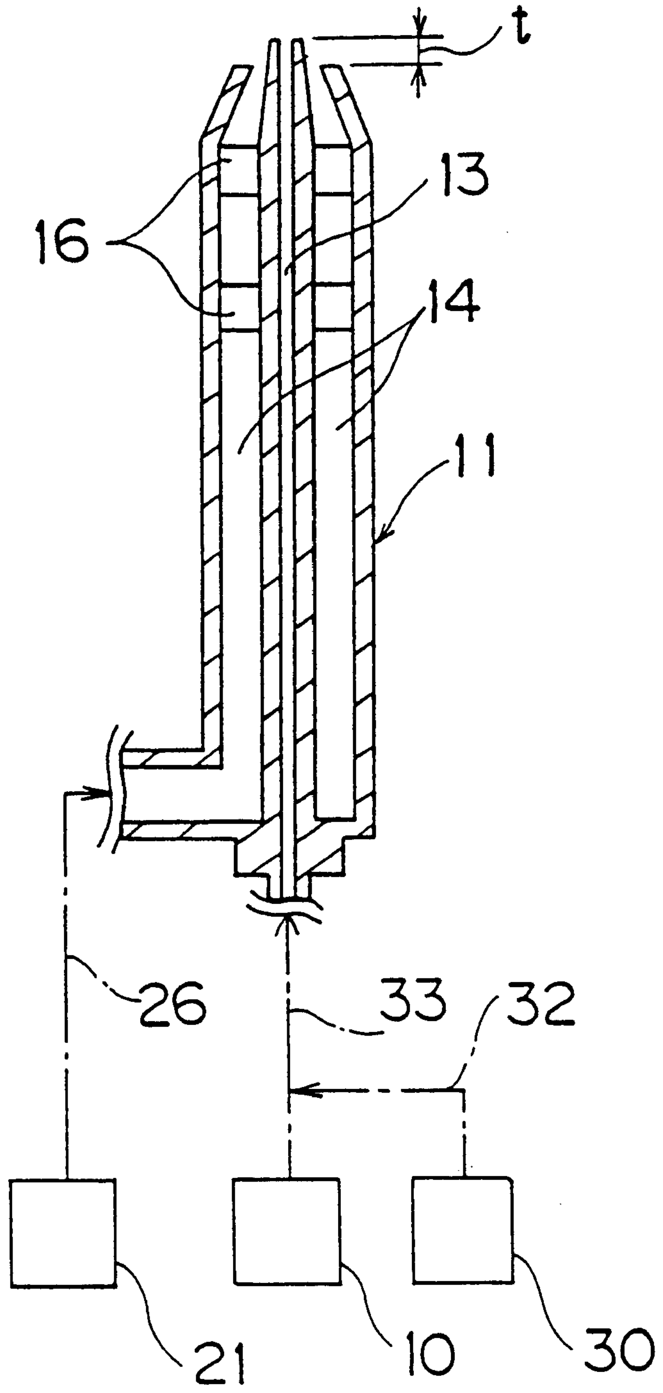
FIG. 4 is a schematic sectional view illustrating an embodiment of the nozzle used in the present invention.
Figure 5:
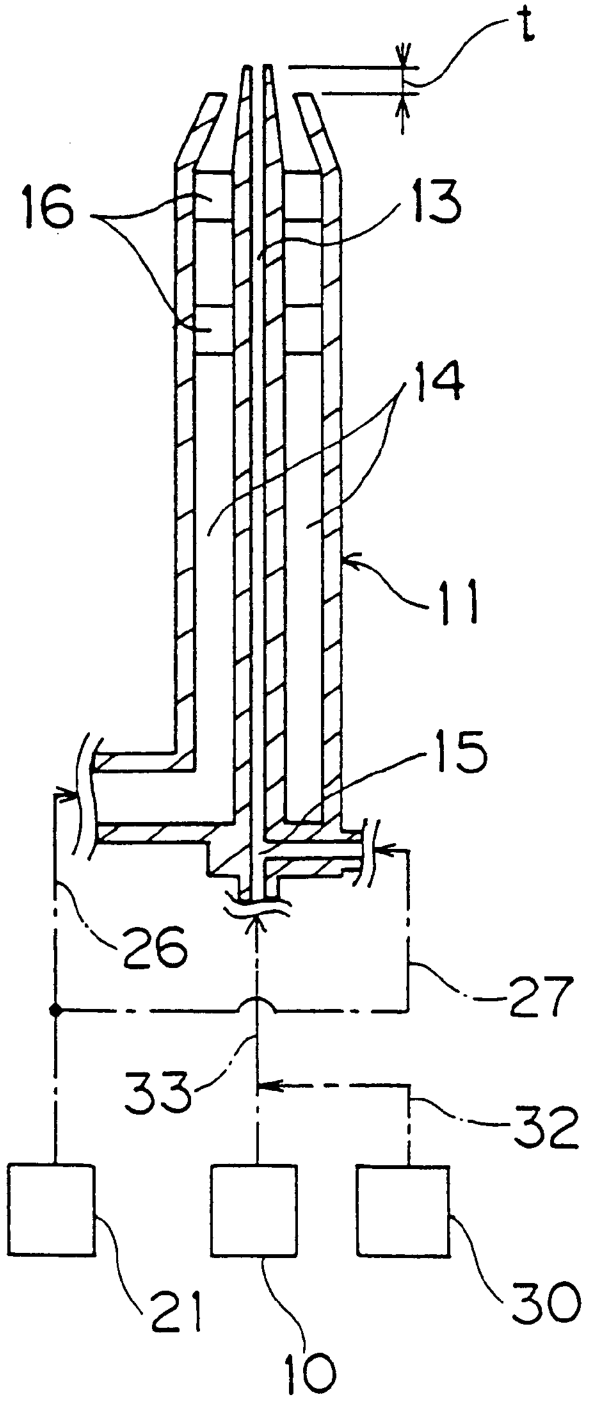
FIG. 5 is a schematic sectional view illustrating another embodiment of the nozzle used in the present invention.

FIGS. 4 and 5 illustrate respectively embodiments of the nozzle 11. The nozzle 11 shown in FIG. 4 has a double-tube structure and is designed to supply the aqueous solution of solid reducing agent into the nozzle inner tube 13 and supply spray gas 21 into the space 14 between the inner and outer tubes. The nozzle shown in FIG. 5 has a double-tube structure in which the inner tube inlet portion 15 has a two-way structure so that the solid reducing agent solution and spray gas 21 are simultaneously supplied into the inner tube 13 and only spray gas 21 is supplied into the space 14 between the inner and outer tubes. The inner tube 13 is also designed so that only spray gas 21 is supplied upon start-up and/or stoppage to remove or replace the residual solution in the nozzle. The inner tube tip end projects by a length t from the outer tube tip end. The length t is within a range of from 1 to 5 mm as described above. In these drawings, 16 is a member supporting the inner tube.

Spray gas 21 to pass through the nozzle inner tube 13 and the space 14 between the nozzle inner and outer tubes is supplied, in a prescribed amount, through flow meters 6 and 7, and simultaneously with this, the aqueous solution 23 of solid reducing agent is sent from the storage tank 10 by the pump 9, controlled to a prescribed amount of injection by the flow control valve 8, then supplied into the inner tube of the nozzle as shown in FIG. 4 or 5 and sprayed to exhaust gas.

In these drawings, 26 is a gas line for supplying spray gas to the space 14 between the inner and outer tubes, and 27 is a gas line for supplying spray gas into the inner tube 13.

The concentration of nitrogen oxides (NOx) in exhaust gas at the gas turbine 1 is measured by an NOx meter 24 whose detecting terminal is arranged in the upstream of the solid reducing agent solution injecting nozzle 11, and the amount of exhaust gas is determined from the output signal of the gas turbine 1. The amount of NOx is derived from these NOx concentration and the amount of exhaust gas. A control signal based on the amount of necessary solid reducing agent corresponding to the resultant NOx value is sent from a controller 25 to the flow control valve 8, and the solid reducing agent solution is sprayed from the nozzle 11 into exhaust gas.

Figure 6:
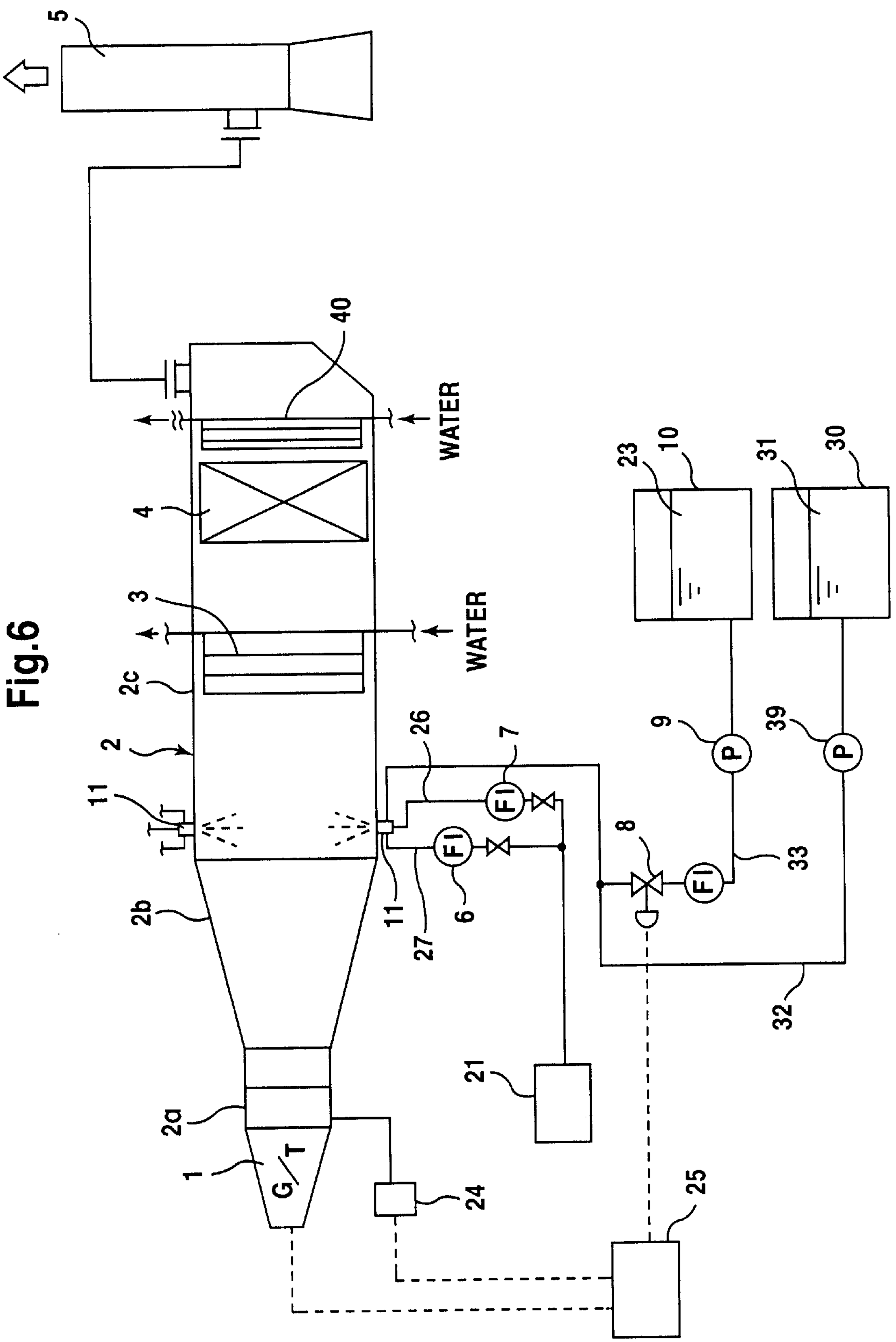
FIG. 6 is a schematic longitudinal sectional view illustrating an apparatus used in another embodiment of the method of the present invention for removing nitrogen oxides.

The nozzle 11 may, as shown in FIG. 6, be installed in the low flow velocity region 2*c*. In this case, the installation of a dispersion plate or the like for diffusion and mixing of the solid reducing agent in the duct 2 is effective for ensuring uniform mixing of the solid reducing agent into exhaust gas.

Figure 7:
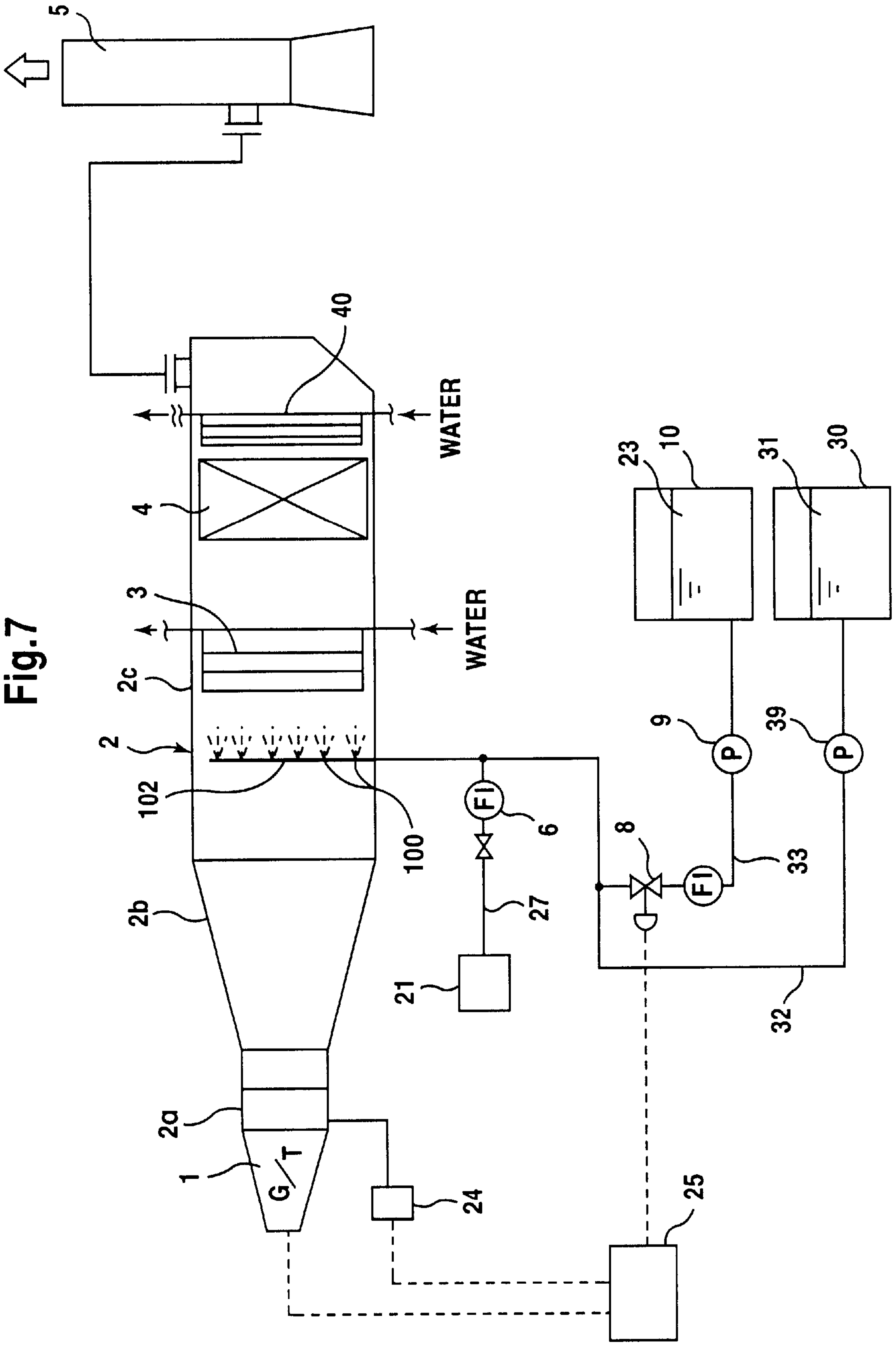
FIG. 7 is a schematic longitudinal sectional view illustrating an apparatus used in further another embodiment of the method of the present invention for removing nitrogen oxides.

A nozzle 11 or 100 may be attached to a piping 102 installed across the duct 2, as shown in FIG. 7, in the apparatus of the present invention.

Figure 8:
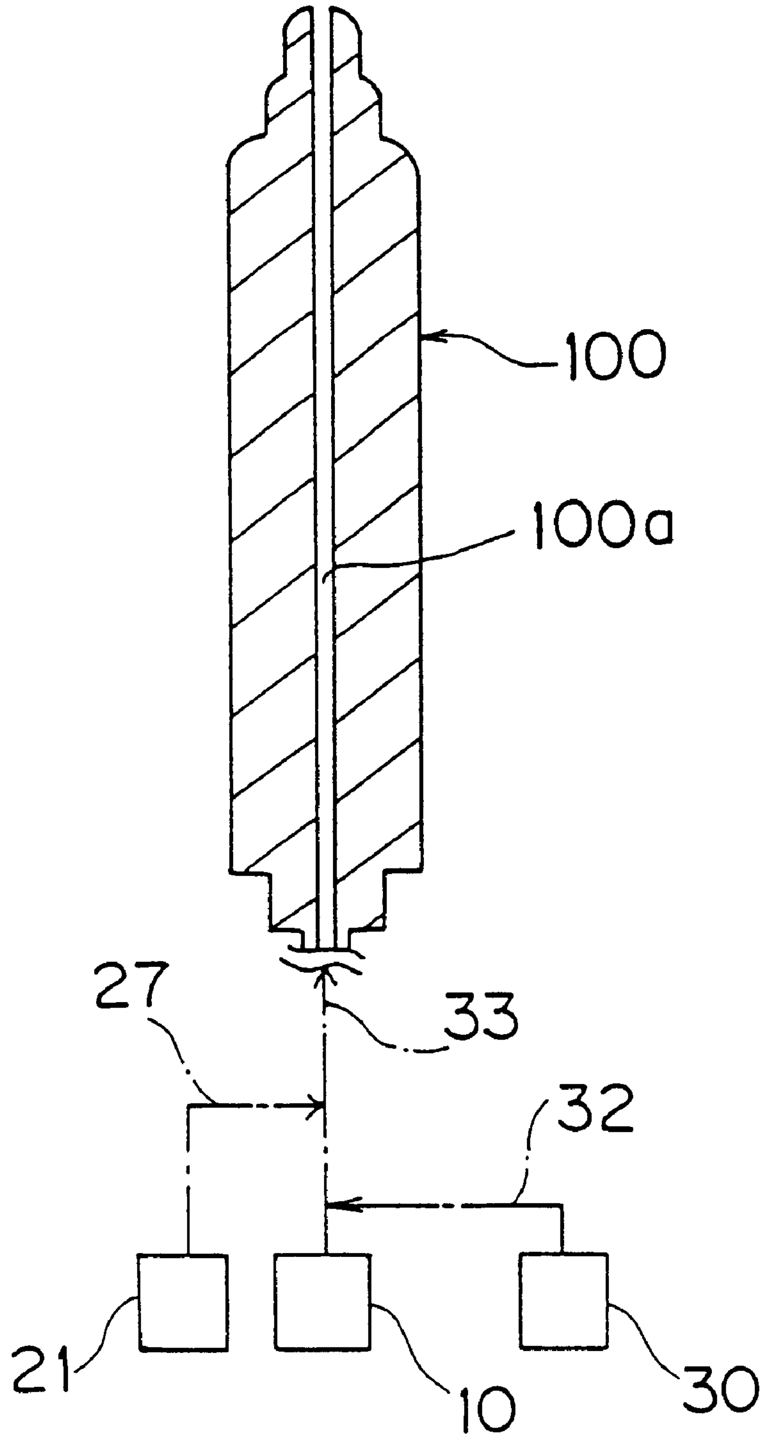
FIG. 8 is a schematic sectional view illustrating further another embodiment of the nozzle used in the present invention.

In the present invention, a nozzle 100 having a single-tube structure as shown in FIG. 8 may be used in place of the nozzle 11 having the double-tube structure. A line 33 for supplying the reducing agent solution is provided between the storage tank 10 for storing the high-concentration aqueous solution 23 of solid reducing agent and the tube 100*a* in the nozzle 100. A water supply line 32 designed to supply water 31 stored in the water storage tank 30 upon start-up and/or stoppage and/or operation is connected to the line 33. Another line 27 supplying spray gas such as air and the like upon start-up and/or stoppage and/or operation may be connected to the line 33 and, if it is arranged like this, the spray gas is supplied to the reducing agent solution.

FIGS. 9 to 13 show examples in which the water supply line 32 is not installed. In FIGS. 1 to 13, the same reference numerals indicate the same parts or components.

Hereinafter, detailed examples of the present invention are shown, but the present invention is not limited to the following examples.

EXAMPLE 1

Using the apparatus shown in FIG. 1 in which the nozzle 11 shown in FIG. 4 was installed in the duct 2 as shown in FIGS. 2 and 3, a de-NOx test was carried out by repeating start-up and stoppage ten times.

High-concentration aqueous solution (40 wt. %) supplied from the storage tank 10 storing 40 wt. % aqueous urea solution by the pump 9 through the supply line 33 joined on the way water supplied from the water storage tank 30 by the pump 39 through the water supply line 32, was diluted, and sprayed from the nozzle 11 into the duct 2 as an aqueous urea solution having a concentration of 7 wt. %.

Using four nozzles 11 in each of which the tip end of the nozzle inner tube projected by 2 mm from the tip end of the nozzle outer tube, the aqueous urea solution diluted to 7 wt. % was supplied at a flow velocity of 1.9 m/second (velocity of passage through the nozzle 11 inner tube) into the nozzle inner tube interior 13 so as to give an $NH_3$/NOx molar ratio of 0.9 as converted into ammonia, and simultaneously with this, air was supplied at a velocity 30 times as high as that of the urea solution flowing through the inner tube interior 13 (velocity of passage through the space 14 between the nozzle inner and outer tubes) into the space 14 between the nozzle inner and outer tubes. Aqueous urea solution was continuously sprayed from the nozzle 11 to exhaust gas in the duct 2, and a de-NOx test was carried out under the conditions as shown in Table 1. Upon start-up, after supplying air through the gas line 27 into the nozzle inner tube interior 13 at a flow rate of 30 l/minute for 10 minutes, the de-NOx treatment was carried out by spraying the aqueous urea solution from the nozzle 11.

Upon stoppage of the de-NOx treatment, supply of the urea solution was discontinued, and then air was supplied into the nozzle inner tube interior 13 at a flow rate of 40 l/minute for 20 minutes.

TABLE 1

| | |
|---|---|
| Exhaust gas: | Gas turbine exhaust gas (output: 1,000 kW) |
| Fuel: | Natural gas |
| Amount of exhaust gas: | 14,200 $Nm^3$/hr |
| Exhaust gas temperature: | 500° C. (at nozzle position)<br>230° C. (at entry to catalyst) |
| NOx concentration in exhaust gas: | 43 ppm VD (at entry to catalyst) |
| Solid reducing agent: | Urea |
| Amount of solid reducing agent: | $NH_3$/NOx = 0.9 (molar ratio) (as converted into ammonia) |
| SV (spatial velocity): | 8,500 $h^{-1}$ |
| Exhaust gas flow velocity: | 25 m/second (in the duct 2 at the nozzle position) |
| Nozzle angle: | Right angles to the exhaust gas flow |
| Catalyst: | $V_2O_5$—$WO_3$—$TiO_2$-based honeycomb catalyst |

The de-NOx reaction was carried out by repeating ten times start-up and stoppage with the above-mentioned operations, and as a result, it was possible continuously to supply the urea solution without nozzle clogging by urea and urea polymers.

It was confirmed that an excellent de-NOx performance was obtained with showing a stable de-NOx efficiency within a range of from 89.3 to 89.6%.

EXAMPLE 2

A de-NOx test was carried out using the apparatus shown in FIG. 1 in which the nozzle 11 shown in FIG. 4 was arranged in the duct 2 as shown in FIGS. 2 and 3.

A high-concentration aqueous solution (40 wt. %) supplied from the storage tank 10 storing the 40 wt. % aqueous urea solution by the pump 9 through the supply line 33 joined on the way water supplied from the water storage tank 30 by the pump 39 through the diluting line 32, was diluted, and sprayed from the nozzle 11 into the duct 2 as an aqueous urea solution having a concentration of 7 wt. %.

Using four nozzles 11 in each of which the tip end of the nozzle inner tube projected by 2 mm from the tip end of the nozzle outer tube, the aqueous urea solution diluted to 7 wt. % as mentioned above was supplied at a flow velocity of 1.9 m/second (velocity of passage through the nozzle 11 inner tube) into the nozzle inner tube interior 13 so as to give an $NH_3$/NOx molar ratio of 0.9 as converted into ammonia, and simultaneously with this, air was supplied at a velocity 30 times as high as that of the urea solution flowing through the inner tube interior 13 (velocity of passage through the space 14 between the nozzle inner and outer tubes) into the space 14 between the nozzle inner and outer tubes. Thus the aqueous urea solution was continuously sprayed from the nozzle 11 to exhaust gas in the duct 2, and the de-NOx test was carried out under the conditions as shown in the forementioned Table 1.

As a result, it was possible continuously to supply the aqueous urea solution for a long period of time of 1000 hours or longer without the clog-off of the nozzle caused by urea and its polymer. The de-NOx efficiency showed 89.5% and the amount of unreacted ammonia showed 0.2 ppm, and thus an excellent result was obtained.

EXAMPLE 3

Figure 9:
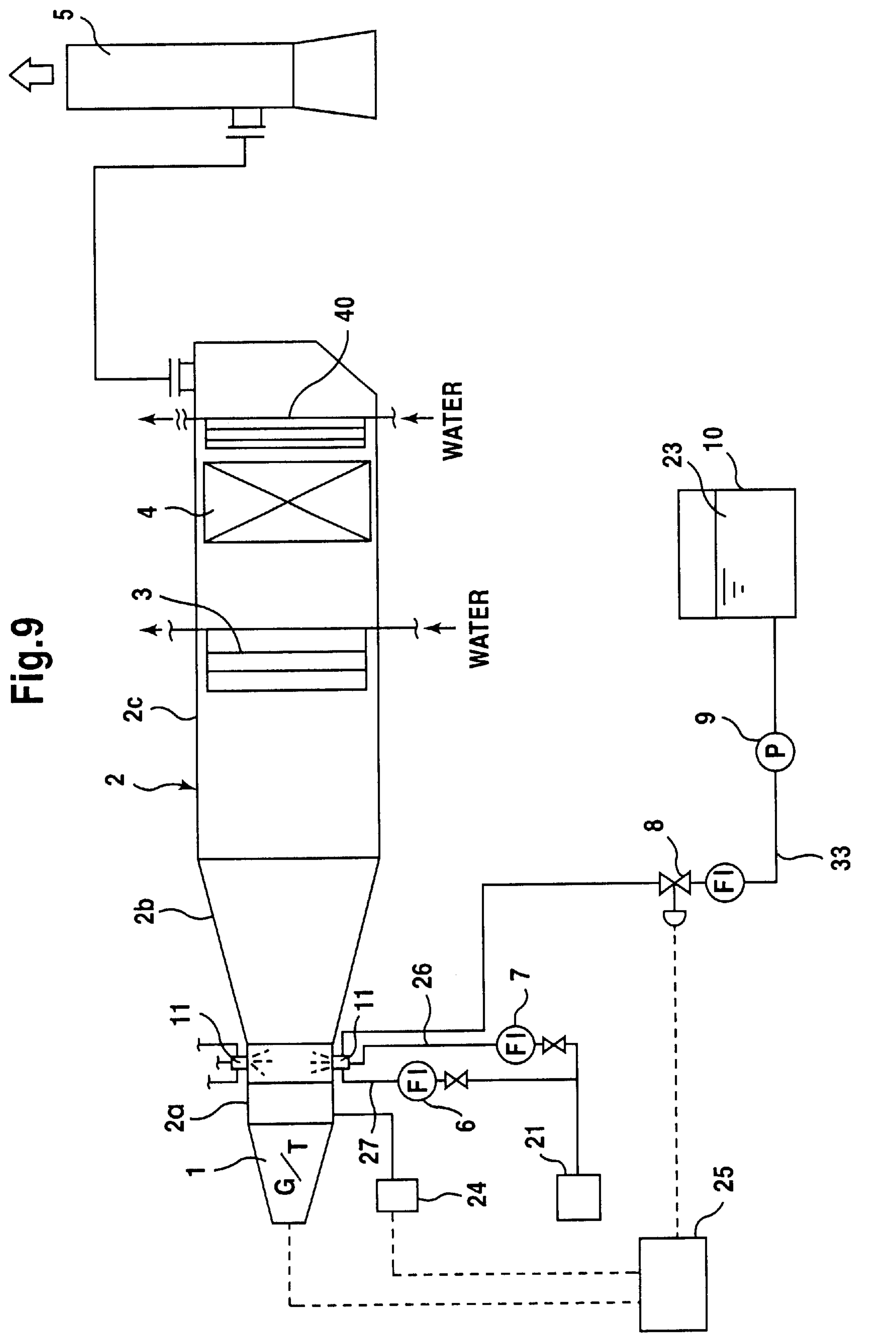
FIG. 9 is a schematic longitudinal sectional view illustrating further another embodiment of the apparatus of the present invention for removing nitrogen oxides.
Figure 10:
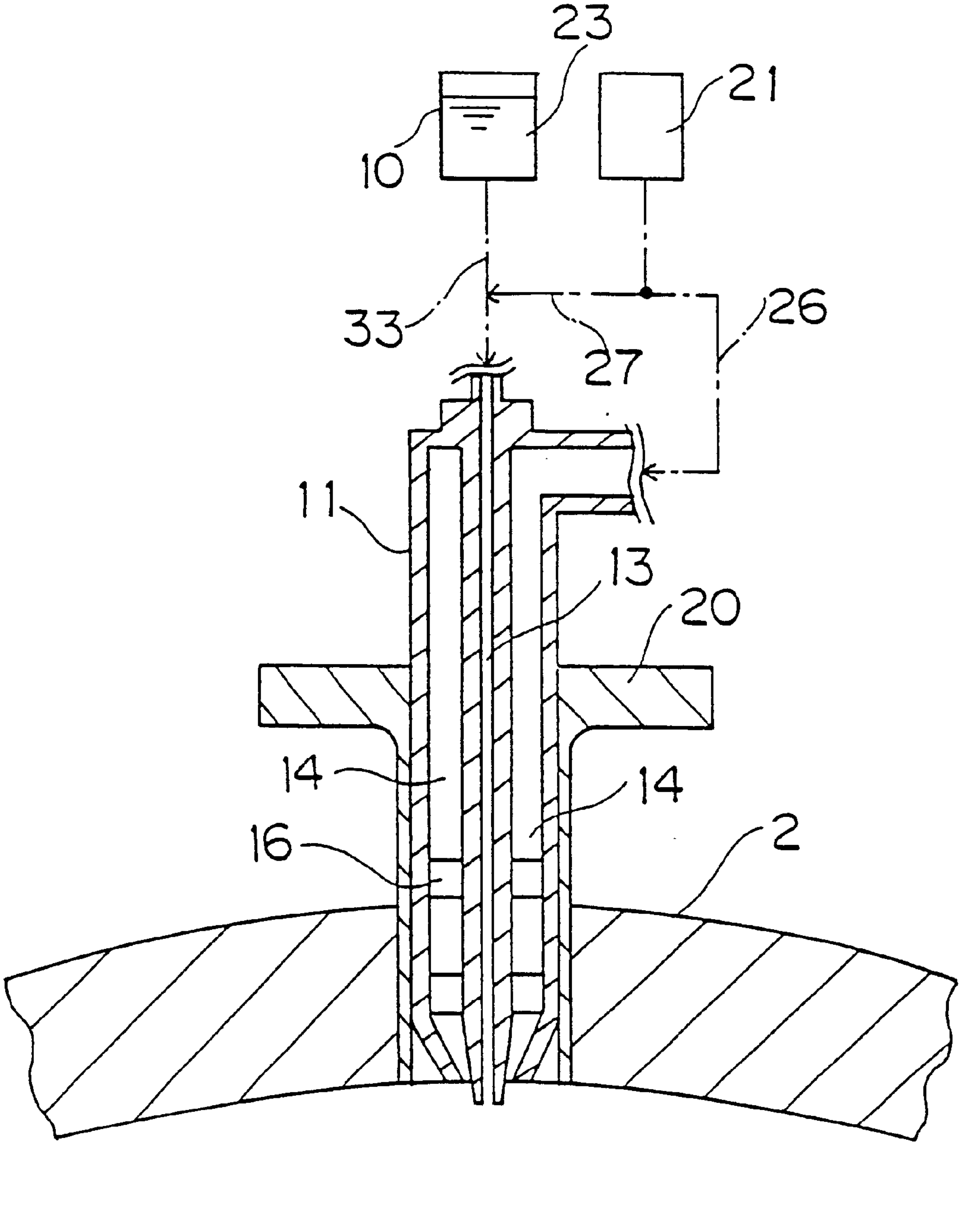
FIG. 10 is a descriptive view illustrating the attachment of the nozzle in the apparatus shown in FIG. 9.
Figure 11:
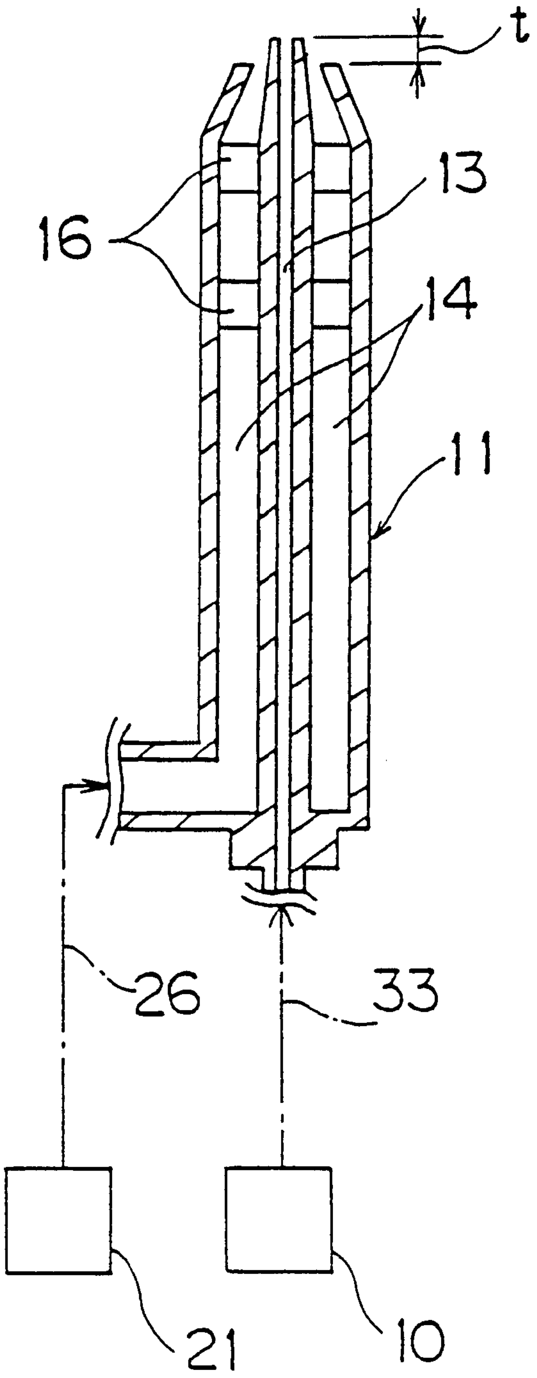
FIG. 11 is a schematic sectional view illustrating an embodiment of the nozzle used in the present invention.

A de-NOx test was carried out using the apparatus shown in FIG. 9 in which the nozzle 11 shown in FIG. 11 was arranged in the duct 2 as shown in FIGS. 2 and 10.

Using four nozzles 11 in each of which the tip end of the nozzle inner tube projected by 2 mm from the tip end of the nozzle outer tube, a 20 wt. % aqueous urea solution was supplied at a flow velocity of 0.7 m/second (velocity of passage through the nozzle 11 inner tube) into the nozzle inner tube interior 13 so as to give an $NH_3$/NOx molar ratio of 0.9 as converted into ammonia, and simultaneously with this, air was supplied at a velocity 50 times as high as that of the urea solution flowing through the inner tube interior 13 (velocity of passage through the space 14 between the nozzle inner and outer tubes) into the space 14 between the nozzle inner and outer tubes. Thus the aqueous urea solution was continuously sprayed from the nozzle 11 to exhaust gas flowing through the duct 2, and the de-NOx test was carried out under the conditions as shown in the forementioned Table 1.

EXAMPLE 4

Figure 12:
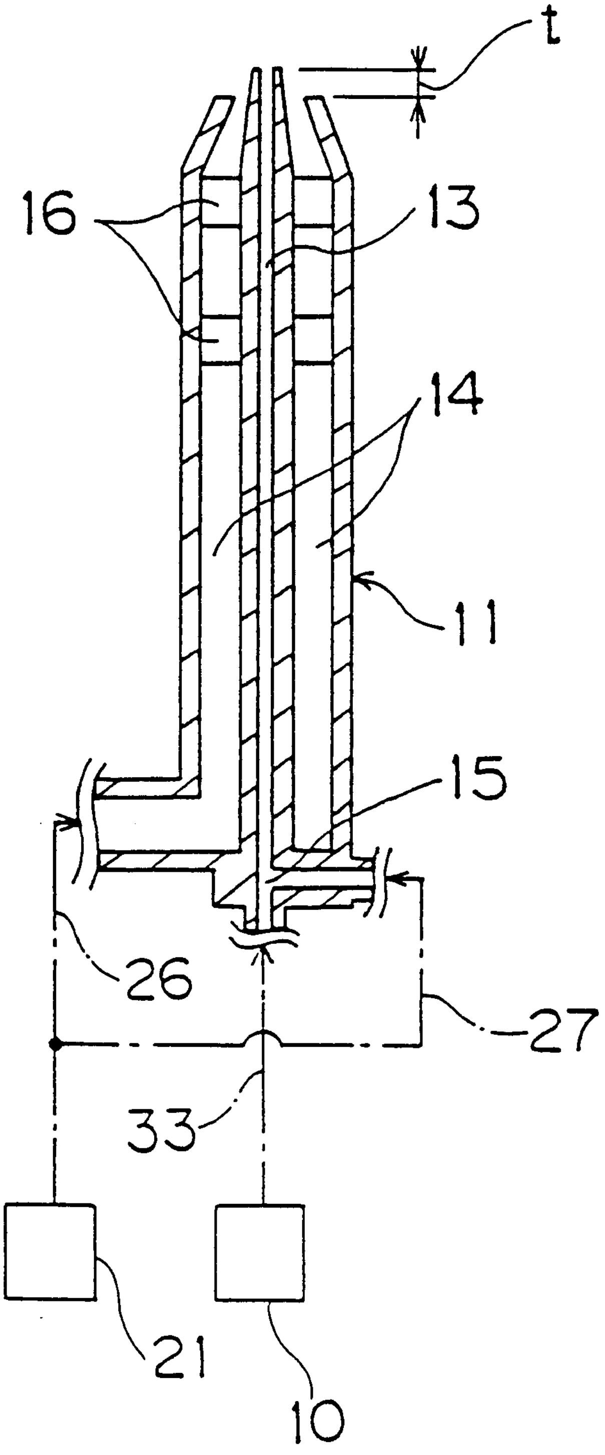
FIG. 12 is a schematic sectional view illustrating another embodiment of the nozzle used in the present invention.
Figure 13:
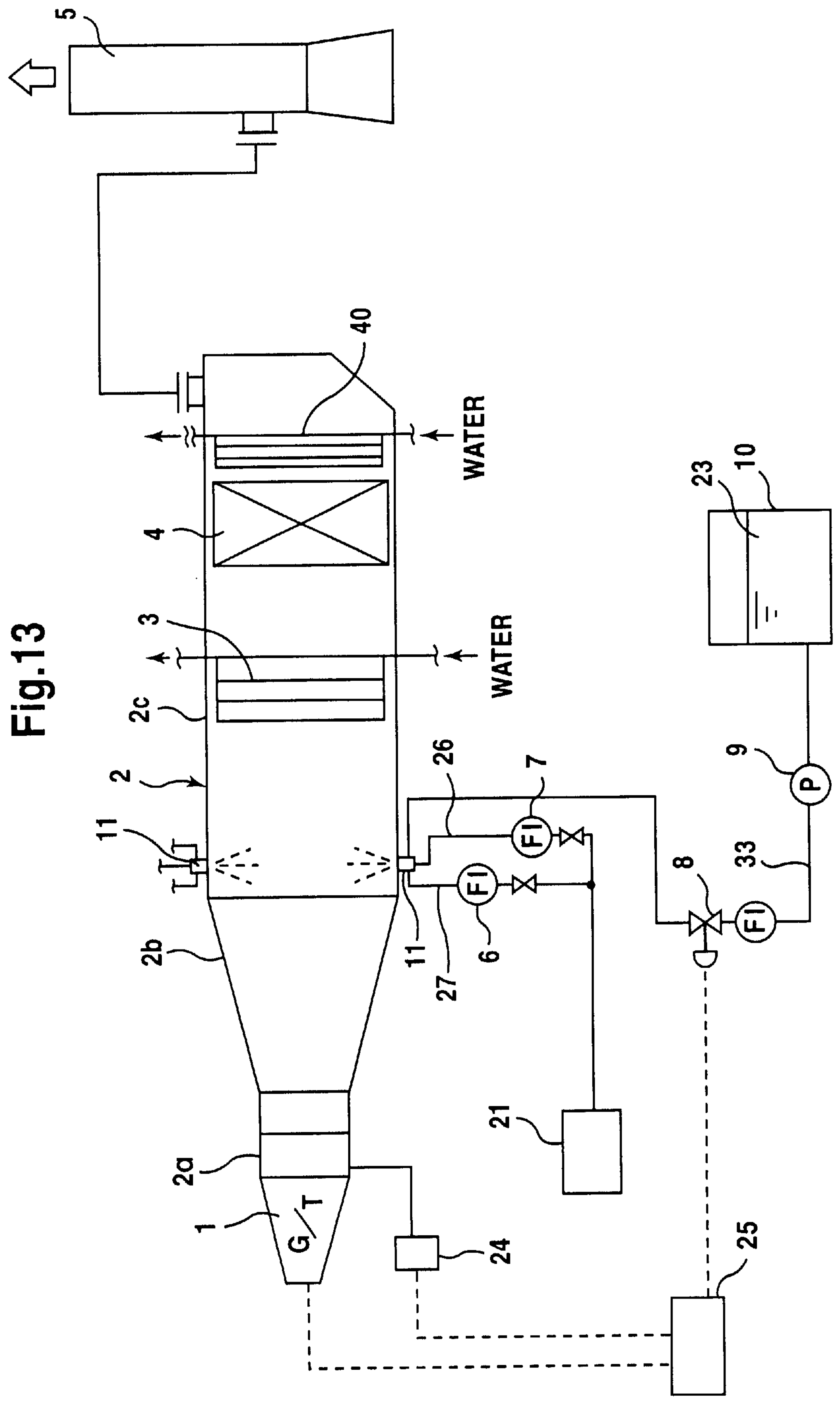
FIG. 13 is a schematic longitudinal sectional view illustrating further another embodiment of the apparatus of the present invention for removing nitrogen oxides.

A de-NOx test was carried out in the same manner as in the EXAMPLE 3 except that the nozzle 11 shown in FIG. 12 was used in place of the nozzle 11 shown in FIG. 11, that the flow rate of air being supplied into the nozzle inner tube interior 13 was set by the flow meter 6, and that an aqueous urea solution and air were supplied to the inner tube interior 13. The flow rate of air being supplied to the nozzle inner tube interior 13 was set at a ratio of 20 volume parts of the spray gas based on one volume part of the urea solution.

Comparative Example 1

A de-NOx test was carried out in the same manner as in the EXAMPLE 3 except that the nozzle 100 shown in FIG. 15 was used in place of the nozzle 11 shown in FIG. 11, and that only the urea solution was supplied to the nozzle 100.

The results showed that, with the comparative nozzle shown in FIG. 15, pulsation occurred at the same time as supply of the urea solution, and after a few hours, the nozzle interior was clogged off by urea and urea polymerization products, thus making it impossible to continue supply of the urea solution. On the other hand, in the examples using the nozzles shown in FIGS. 11 and 12, no pulsation occurred, and nozzle clogging caused by urea and urea polymers did not occur for a long period of time of 1,000 hours or longer, thus permitting continuous supply of urea solution.

The results of de-NOx efficiency in the EXAMPLES 3 and 4 and the COMPARATIVE EXAMPLE 1 are shown in Table 2.

The de-NOx efficiency was determined by measuring the $NO_x$ concentration at the entry and the exit of the catalyst layer 4 by an $NO_x$ meter 24.

TABLE 2

| | Nozzle | De-NOx efficiency (%) |
|---|---|---|
| EXAMPLE 3 | Nozzle 11 shown in FIG. 11 | 87.5 |
| EXAMPLE 4 | Nozzle 11 shown in FIG. 12 | 89.3 |
| COMPARATIVE EXAMPLE 1 | Nozzle 100 shown in FIG. 15 | 62.2 |

As shown in Table 2, when using the apparatus of the present invention, as compared with the case of using the nozzle of FIG. 15, the urea solution is sprayed in a state where it was finely divided by air passing through the space between the inner and outer tubes, resulting in more uniform mixing in the exhaust gas, and hence the excellent de-NOx efficiency.

EXAMPLE 5

De-NOx treatment was carried out in the same manner as in the EXAMPLE 3 except that the diameter of the duct 2 was varied to change the exhaust gas flow velocity in the duct. The relationship between the exhaust gas flow velocity in the duct at the nozzle position and the de-NOx performance was investigated. The results were shown in Table 3.

TABLE 3

| Exhaust gas flow velocity in high flow velocity region 2a of the duct 2 (m/s) | De-NOx efficiency (%) |
|---|---|
| 5 | 78.2 |
| 10 | 84.4 |
| 15 | 88.6 |
| 20 | 89.3 |
| 25 | 89.3 |
| 30 | 89.3 |

As shown in Table 3, a higher exhaust gas flow velocity in the duct 2 leads to a more improved de-NOx efficiency: with a gas flow velocity of at least 15 m/second, the urea solution and nitrogen oxides contained in exhaust gas are deemed to be uniformly mixed together.

What is claimed is:

1. A method for start-up and shutdown of an apparatus for reducing nitrogen oxides in an exhaust gas driven through an effluent duct from a combustion source, the method comprising the steps of:

(a) providing at least one double-tubular nozzle to communicate the nozzle with the effluent duct, the nozzle comprising an inner tube and an outer tube radially surrounding the inner tube, a tip of the outer tube being flush with or lower than an inner peripheral surface of the effluent duct, and a tip of the inner tube projecting by 1 to 5 mm from the tip of the outer tube;

(b) introducing a cooling fluid through the inner tube for a time interval sufficient to cool the inner tube so that a solid reducing agent dissolved in a treating fluid subsequently-supplied therethrough is prevented from crystallization out of the treating fluid on the inner tube;

(c) supplying a treating fluid from the inner tube and simultaneously supplying a gas from the inner peripheral surface or lower position of the effluent duct through a space between the inner and outer tubes, the treating fluid having a solid reducing agent dissolved therein and the gas being inert to the reducing agent, the gas supplied through the space between the inner and outer tubes mixing with the treating fluid as the treating fluid exits the inner tube, thus spray-injecting the treating fluid into the effluent duct, thereby mixing the treating fluid with the exhaust gas containing nitrogen oxides, thereby reducing the nitrogen oxides in the exhaust gas; and (d) cutting off the spray-injecting of the treating fluid through the inner tube and flushing the inner tube with a flushing fluid at least until treating fluid remaining in the inner tube is replaced with the flushing fluid.

2. A method as set forth in claim 1 wherein said time interval is at least three minutes.

3. A method as set forth in claim 1, further comprising the step of diluting the treating fluid with water before the treating fluid is supplied in step (c) in order to minimize residual unreacted reducing agent within the effluent duct.

4. A method as set forth in claim 1, wherein step (c) further comprises supplying gas simultaneously with the treating fluid through the inner tube.

5. A method as set forth in claim 4, wherein the gas supplied into the inner tube is supplied at a flow ratio of 20 volume parts gas to one volume part treating fluid.

6. A method as set forth in claim 1, wherein the gas which is supplied between the inner and outer tubes is supplied at a velocity at least ten times as high as a velocity at which the atomized treating fluid is supplied into the inner tube.

7. A method as set forth in claim 1, wherein the gas which is supplied between the inner and outer tubes is supplied at a velocity 50 times as high as a velocity at which the atomized treating fluid is supplied into the inner tube.

8. A method as set forth in claim 1, wherein the exhaust gas is driven from a gas turbine in a co-generation system.

9. A method as set forth in claim 1, wherein the exhaust gas has a flow velocity of at least 15 m/sec at an area where the atomized treating fluid enters the effluent duct.

10. A method as set forth in claim 9, further comprising, after step (c), the steps of reducing the flow velocity of the exhaust gas from at least 15 m/sec to 5–10 m/sec, decomposing the reducing agent by heat wherein the reducing agent contains a substance which decomposes to form ammonia, and exposing the exhaust gas and ammonia to a catalyst material disposed within the duct downstream of the nozzle.

11. A method as set forth in claim 1, wherein the effluent duct is cylindrical and four of said nozzles are provided at every 90° along a side peripheral surface of the duct.

12. A method as set forth in claim 1, wherein a tip of the nozzle outer tube is tapered such that flow of the gas supplied through the space between the inner and outer tubes intersects with flow of the treating fluid exiting the inner tube.

13. A method as set forth in claim 12, wherein the tip of said outer tube does not project from an inner peripheral surface of the duct into a duct interior, and the tip of said outer tube is tapered such that flow of gas supplied through the space between the inner and outer tubes intersects with flow of treating fluid exiting the inner tube.

14. A method as set forth in claim 1, wherein the cooling fluid comprises a gas inert to the reducing agent.

15. A method as set forth in claim 14, wherein the cooling fluid is air.

16. A method as set forth in claim 1, wherein the flushing fluid comprises a gas inert to the reducing agent.

17. A method as set forth in claim 16, wherein the flushing fluid is air.

18. A method as set forth in claim 16, wherein the flushing fluid is supplied for at least three minutes.

19. A method as set forth in claim 1, further comprising repeating said steps (b), (c) and (d) a plurality of times.

20. A method as set forth in claim 1, further comprising repeating said steps (b), (c) and (d) ten times.

* * * * *